US 8,237,377 B2
Aug. 7, 2012

(12) United States Patent
Hopper

(10) Patent No.: US 8,237,377 B2
(45) Date of Patent: Aug. 7, 2012

(54) ENERGY EFFICIENT LIGHTING SYSTEM AND METHOD

(75) Inventor: Michael Blair Hopper, Worcester, MA (US)

(73) Assignee: Michael Blair Hopper, Worcester, MA (US)

( * ) Notice: Subject to any disclaimer, the term of this patent is extended or adjusted under 35 U.S.C. 154(b) by 308 days.

(21) Appl. No.: 12/630,102

(22) Filed: Dec. 3, 2009

(65) Prior Publication Data

US 2010/0148672 A1    Jun. 17, 2010

Related U.S. Application Data

(60) Provisional application No. 61/121,810, filed on Dec. 11, 2008, provisional application No. 61/121,816, filed on Dec. 11, 2008.

(51) Int. Cl.
*H05B 37/02* (2006.01)

(52) U.S. Cl. ........ 315/294; 315/291; 315/307; 315/309; 315/312; 362/800; 362/373; 362/294

(58) Field of Classification Search ................ 315/294, 315/291, 307, 309, 312; 362/800, 373, 294
See application file for complete search history.

(56) References Cited

U.S. PATENT DOCUMENTS

| 7,144,135 | B2 * | 12/2006 | Martin et al. ................. 362/294 |
| 7,210,825 | B2 * | 5/2007 | Watanabe et al. ............. 362/373 |
| 2005/0043907 | A1 | 2/2005 | Eckel et al. |
| 2007/0064433 | A1 * | 3/2007 | Wright ........................ 362/364 |
| 2008/0158878 | A1 | 7/2008 | Van Laanen |
| 2008/0285257 | A1 | 11/2008 | King |
| 2009/0085500 | A1 * | 4/2009 | Zampini et al. ............... 315/297 |
| 2009/0267540 | A1 * | 10/2009 | Chemel et al. ................ 315/297 |

* cited by examiner

*Primary Examiner* — Jacob Y Choi
*Assistant Examiner* — Anthony Arpin
(74) *Attorney, Agent, or Firm* — Richard L. Sampson

(57) ABSTRACT

A light system and method includes a housing having an array of LEDs spaced to transmit light within a field of illumination. An EM sensor disposed within the housing is configured to detect EM radiation within the field of illumination. A processor is configured to generate an output in response to levels of EM radiation, such as visible light, infrared light, and/or radio frequency (RF) radiation detected by the EM sensor relative to a predetermined setpoint.

38 Claims, 4 Drawing Sheets

ENERGY EFFICIENT LIGHTING SYSTEM AND METHOD

RELATED APPLICATION

This application claims the benefit of U.S. Provisional Patent Application Ser. Nos. 61/121,810, entitled Energy Efficient Lighting System and Method, filed on Dec. 11, 2008, and 61/121,816, entitled AC/DC Electrical Panel, filed on Dec. 11, 2008, the contents of which are incorporated herein by reference in their entireties for all purposes.

This application is also related to U.S. patent application Ser. No. 12/630,074, entitled Electrical Panel, filed on even date herewith, the contents of which are incorporated herein by reference in their entirety for all purposes.

BACKGROUND

1. Technical Field

This invention relates to energy efficient lighting and light management systems, devices and methods. More particularly, the present invention relates to energy efficient low voltage lighting and light management systems, devices, and methods of automatically and manually controlling room lights.

2. Background Information

Throughout this application, various publications, patents and published patent applications are referred to by an identifying citation. The disclosures of the publications, patents and published patent applications referenced in this application are hereby incorporated by reference into the present disclosure.

There is a continual push to reduce energy consumption, because of rising energy costs and negative environmental impacts of energy usage and energy generation.

A number of different light and light management systems are known. One type of light management system utilizes a motion detector or sensor. In such systems, room lights are turned off, turned on and/or are dimmed according to a detected level of motion within the room. Such systems have been routinely used in conjunction with conventional incandescent lights which are relatively easily dimmed.

However, in an effort to further enhance efficiency, incandescent lights are being routinely phased out in favor of more energy efficient fluorescent lights. Fluorescent lights generate substantially less heat than incandescent bulbs, and thus use far less electricity for a given amount of light output. Unfortunately, fluorescent lights are not easily dimmed, and use mercury, a hazardous material which complicates disposal/recycling of the bulbs at the end of their useful life. In addition, fluorescent lights tend to be relatively energy intensive upon start-up, i.e., power drawn by fluorescent ballasts tends to spike during start-up, which tends to militate against turning them off and back on repeatedly. Indeed, in applications involving such frequent cycling, energy savings achieved while the lights are off may be effectively offset by the energy drawn during start-up.

Therefore, there is a need for improved light management systems, devices and methods which help to conserve energy.

SUMMARY

In one aspect of the invention, a light system includes a housing having an array of LEDs located in spaced relation within the housing, to receive power from a power source and to transmit light within a field of illumination. An electromagnetic (EM) sensor located within the housing is configured to detect EM radiation levels within the field of illumination of the LEDs. A processor communicably coupled to the EM sensor, is configured to generate an output in response to levels of EM radiation detected by the EM sensor relative to a predetermined setpoint.

In another aspect of the invention, the light system of the above aspect also includes a packet-based communications module operatively engaged with the processor, and is configured to receive from a remote location, adjustments to the predetermined setpoint. A cooling fan is disposed within the housing to move cooling air to the LEDs in response to actuation of a thermal switch. A baffle is located to alternately open and close a vent in the housing to alternately direct cooling air from the LEDs towards locations on opposite sides (e.g., above and below) of the housing. An actuator is used to operate the baffle in response to a thermostat located within the housing. The housing also includes a speaker driver which enables the light system itself to function as a loudspeaker.

In yet another aspect of the invention, a method of illuminating a premises includes installing one or more of the light systems of the foregoing aspects, and loading into the light systems, the predetermined setpoint, wherein the light systems automatically adjust the output of the LEDs in response to changes in ambient light levels.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
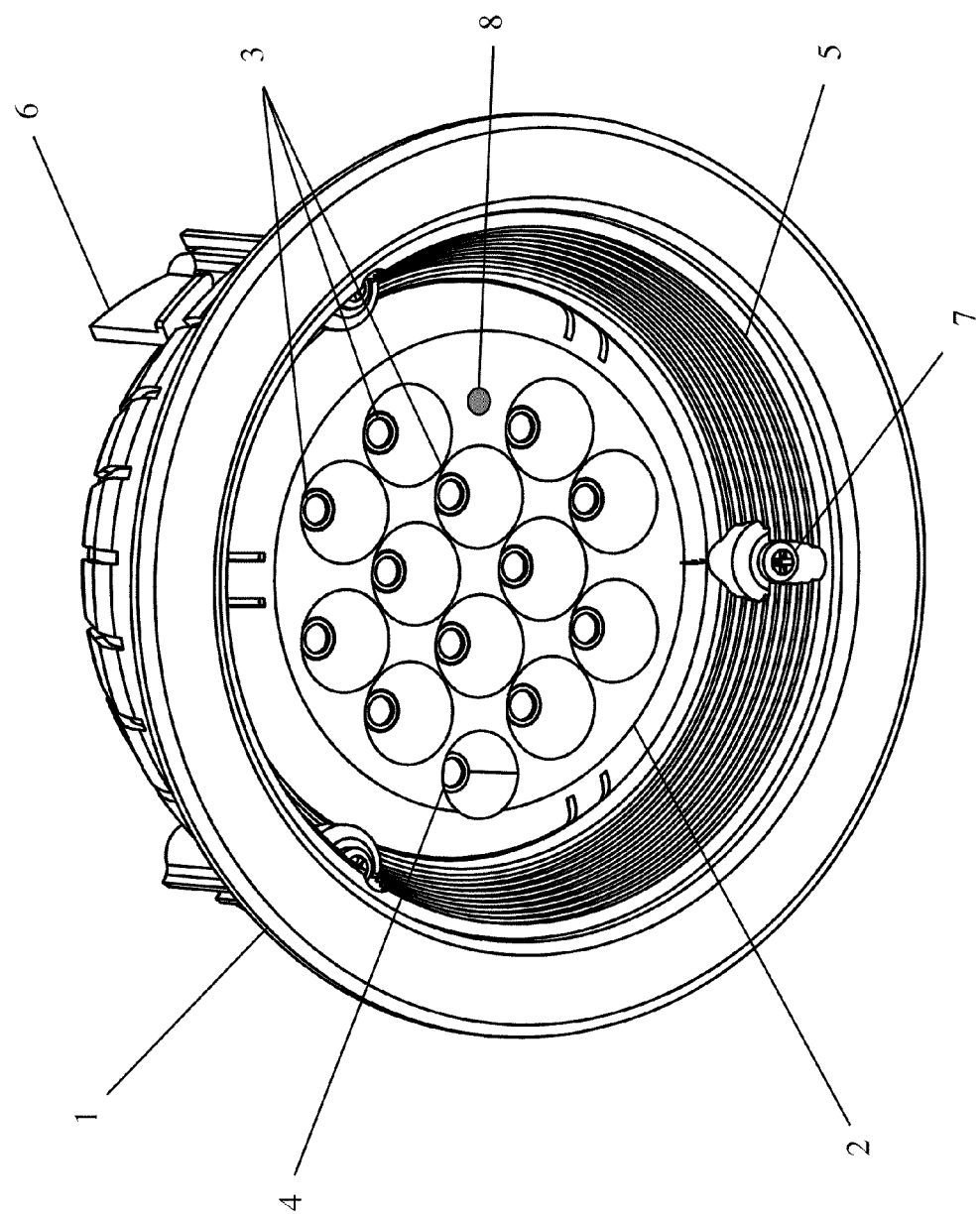
FIG. 1 is a perspective bottom view of an embodiment of the present invention.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. In addition, well-known structures, circuits and techniques have not been shown in detail in order not to obscure the understanding of this description. The following detailed description is, therefore, not to be taken in a limiting sense, and the scope of the present invention is defined by the appended claims and their equivalents. For clarity of exposition, like features shown in the accompanying drawings are indicated with like reference numerals and similar features as shown in alternate embodiments in the drawings are indicated with similar reference numerals.

Where used in this disclosure, the terms "computer" and "network element" are meant to encompass a workstation, personal computer, personal digital assistant (PDA), wireless telephone, or any other suitable computing device including a processor, a computer readable medium upon which computer readable program code (including instructions and/or data) may be disposed, and a user interface. The terms "real-time" and "on-demand" refer to sensing and responding to external events nearly simultaneously (e.g., within milliseconds or microseconds) with their occurrence, or without intentional delay, given the processing limitations of the system and the time required to accurately respond to the inputs.

The system and method embodying the present invention can be programmed in any suitable language and technology, such as, but not limited to: C++; Visual Basic; Java; VBScript; Jscript; BCMAscript; DHTM1; XML and CGI. Alternative versions may be developed using other programming languages including, Hypertext Markup Language (HTML), Active ServerPages (ASP) and Javascript. Any suitable database technology can be employed, such as, but not limited to, Microsoft SQL Server or IBM AS 400.

Figure 2:
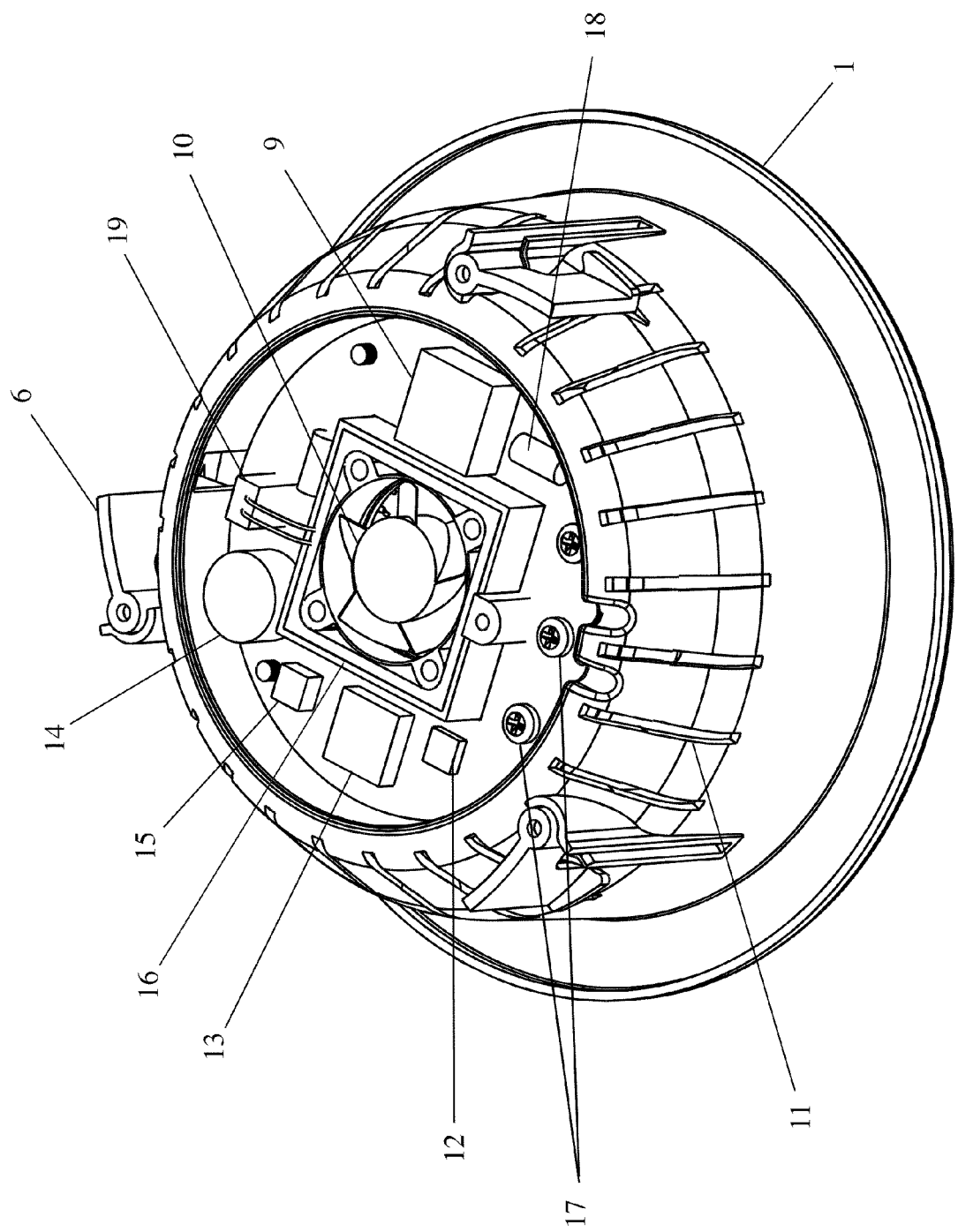
FIG. 2 is a perspective top view of the embodiment of FIG. 1.

Briefly, as shown in FIGS. 1 and 2, an exemplary light system of the present invention includes an LED (organic or inorganic Light Emitting Diode) recessed lighting system configured for being flush mounted in a ceiling, e.g., within the sheet rock or suspended ceiling panel of a commercial or residential ceiling. For example, this recessed LED light system includes a housing 1, which in particular embodiments, may have a diameter of about six inches or eight inches. It should be recognized, however, that housings 1 may be provided with substantially any desired size and shape, and may be flush, surface, suspended or fixture mounted. A reflector 2 is provided with an array of LEDs 3, along with an Electro-Magnetic (EM) sensor (e.g., an optical sensor, such as a photodiode, CCD device, etc.) 4. A baffle 5 is disposed between the housing 1 and reflector 2. A series of (e.g., three) conventional clamp tabs 6 in combination with clamp screws 7 are used to secure the housing 1 to a ceiling in a conventional manner.

Figure 3:
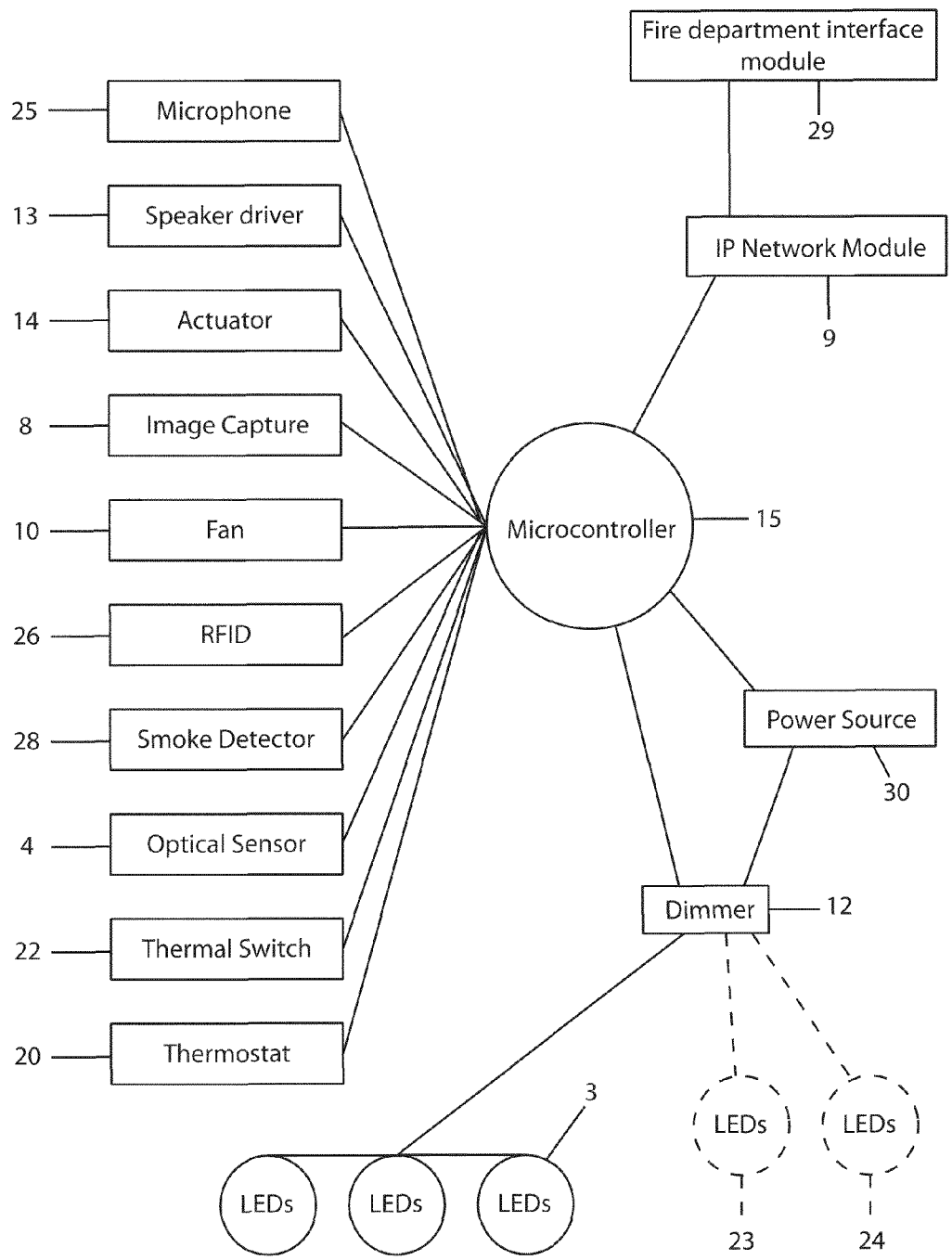
FIG. 3 is a functional block diagram of the embodiment of FIGS. 1 and 2.

As best shown in FIG. 2, power is supplied to the system by electrical connection screws 17, terminal blocks or substantially any other connection means, which in particular embodiments, are configured for connection to a power source 30 (FIG. 3), such as a low voltage power supply which converts line voltage (e.g., 110 or 220 VAC) to low voltage (e.g., 12 or 24 VDC). Backup power (e.g., for utility power outages) may be provided by module (e.g., battery or super capacitor) 18. In this regard, module 18 may provide power sufficient to operate the light system, for example, to illuminate the LEDs at reduced power during a power blackout or brownout, as discussed in greater detail hereinbelow.

An IP network (and/or MAC address) module 9 may also be provided to enable communication with an IP network, e.g., to a central control panel and/or to other light systems. A fan 10 facilitates cooling, e.g., via air vents 11. Other components that may be included in particular embodiments include a dimmer 12, a speaker driver 13, an actuator (e.g., servo motor or solenoid) 14, a microprocessor (processor) 15 (e.g., including built-in random access memory (RAM)) and optionally, an anti-vibration pad 16. Dimmer 12 may include a current and/or voltage limiter, a Pulse Width Modulation (PWM) module, or substantially any other type of dimming device known to those skilled in the art.

A generalized embodiment having been described, the following is a description of various aspects of particular embodiments in greater detail, along with their operation.

As shown in FIG. 1, an array of LEDs 3 is provided. (The embodiment shown has twelve LEDs, which in particular embodiments are white. However, substantially any number of white or RGB (Red, Green, Blue) LEDs may be provided. In this regard, RGB LEDs may be used to enable the overall color of light emitted from the light system to be adjusted. For example, the LEDs of particular color may be selectively powered as desired to adjust the "color temperature" (also known as "Kelvin temperature") in the room, e.g., by providing a whiter, "colder" light, or a more yellow "warmer" light. Similar color adjustability may also be provided by the use of white LEDs of two or more distinct Kelvin temperature. For example, some of the LEDs may have a 2700K temperature, while others may have a 4000K temperature. The individual LEDs may then be selectively actuated in various ratios to produce a light output ranging color temperature substantially anywhere within a range of 2700K (with only the 2700K LEDs actuated) to 4000k (with only the 4000K LEDs actuated).

Figure 4:
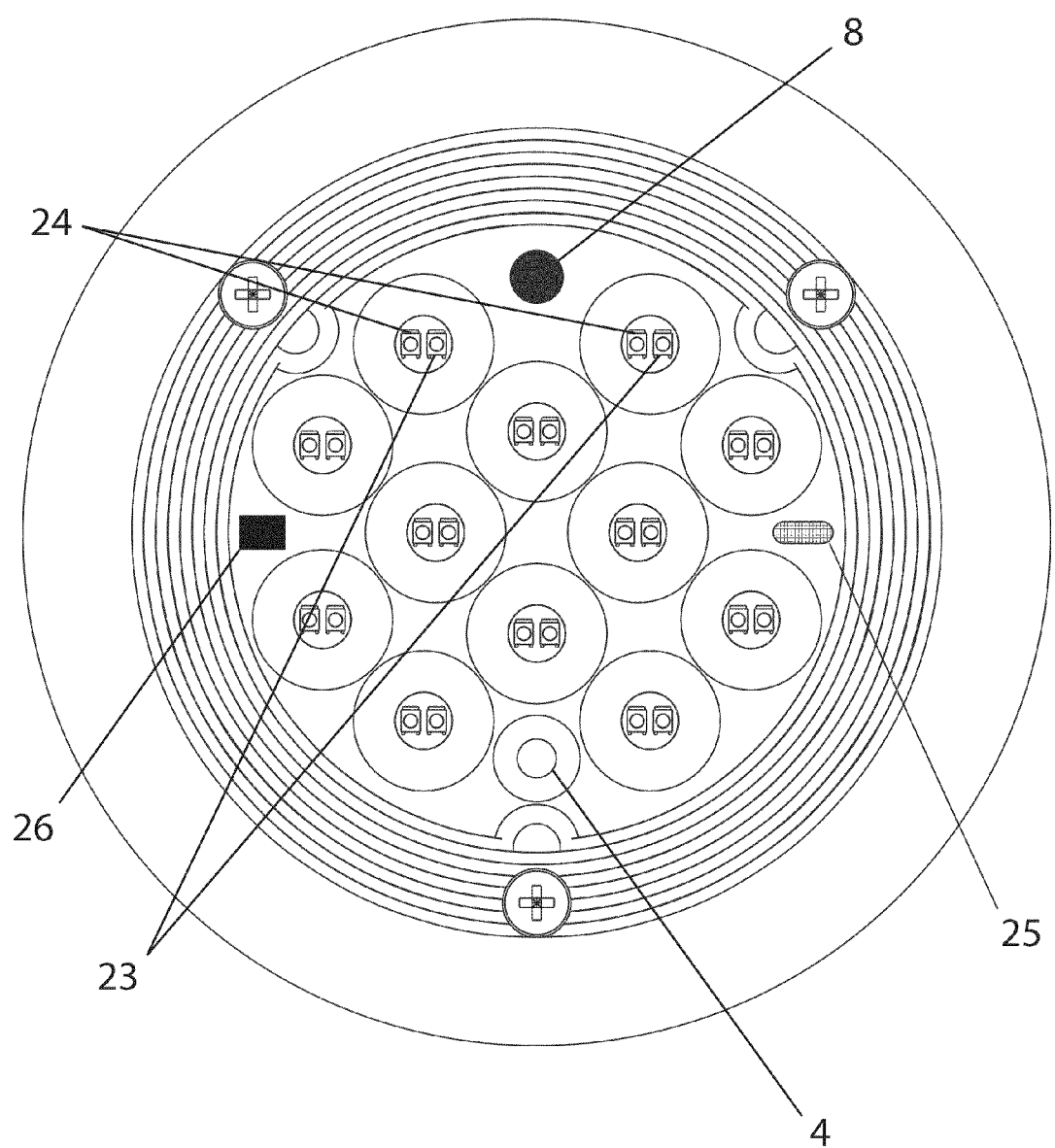
FIG. 4 is a bottom view of an alternative embodiment of the present invention.

One particular example of this concept is shown in FIG. 4. In this example, the individual LEDs 3 (FIG. 1) are replaced with closely coupled pairs of white LEDs 23 and 24 as shown. Each of the LEDs 23, 24 has mutually distinct color temperatures, and may be actuated independently (e.g., by microcontroller 15). Thus, LEDs 23 may have a 2700K temperature, while LEDs 24 may have a 4000K temperature. The individual LEDs 23, 24 may then be selectively actuated in various ratios as discussed above, to produce a combined light output ranging in color temperature substantially anywhere within a range of 2700K (with only the 2700K LEDs actuated) to 4000k (with only the 4000K LEDs actuated). The close coupling of the individual LED pairs 23, 24 helps to ensure that the different color temperature light is evenly mixed and distributed to provide a substantially uniform output.

The various light systems within a room or other predetermined area may be adjusted remotely by a computer or other network element communicably coupled to network modules 9. In this regard, a desired color temperature may be uploaded to the individual light systems. Processors 15 of each light system may then actuate a sufficient combination of LEDs 23 and 24 to achieve the desired color temperature. This color adjustment may thus be accomplished in an open-loop manner, i.e., by simply actuating a predetermined combination of LEDs in response to a desired color temperature input. Alternatively, EM sensor 4 may be configured as a Kelvin meter, e.g., a light temperature meter (or an external Kelvin meter such as may be coupled to the IP network may be used), to provide closed-loop feedback to processor 15. Such closed-loop feedback may be desired to compensate for any slight changes in the output of the LEDs that may naturally occur over the life of the LEDs. This configuration of EM sensor 4 as a Kelvin meter may also be used to enable the light systems to adjust themselves to one another, as will be discussed in greater detail hereinbelow.

In addition to color temperature detection, in particular embodiments, EM sensor 4 may be configured, e.g., by processor 15, to look for a predetermined amount of infrared light in the room within a predetermined time frame. For example, optical sensor 4 and processor 15 may periodically (e.g., ranging from once every 50 milliseconds to once every few minutes or so), look for an infrared signature such as would be indicative of the presence of a person in the room. Then, during a subsequent or intervening time interval, processor 15 may actuate EM sensor 4 to look for the overall visible light level within the room, such as to generate a reading of lumens (or lux) per square foot. This latter reading may then be used to adjust the output of the LEDs 3 in order to compensate for factors such as light entering the room through windows, etc., to maintain a predetermined lumen level when a room is occupied, as will be discussed in greater detail hereinbelow.

In addition to the color temperature setting discussed above, IP network module 9 enables multiple light systems to conveniently communicate with one another to let each light know what the others are doing, e.g., how much light it is outputting and whether or not it is detecting an IR signature corresponding to the presence of a person within its field of view. Moreover, by use of memory (e.g., RAM) operatively associated with processor 15, the captured infrared signature may be stored, e.g., along with a time stamp, for a predetermined length of time. For example, processor 15 and its memory may be configured to capture and store a record of the events for the past half hour or hour. In this manner, a person's signature may be tracked as he or she moves from the field of view of one light system to another light system. In addition, EM sensor 4, and/or an additional detector in the form of an image capture device (e.g., camera lens/CCD device) 8 (FIG. 1) may be used to capture images or video of the room, such as for fire safety and security monitoring as discussed below. A microphone 25 (FIG. 4) may also be utilized in connection with the IR/image/video capture. This captured information may also be relayed to a server and/or an internet storage device via the IP network for storage indefinitely.

It should be recognized that this information may be communicated via the IP network in the event of a power failure in the building, by use of battery or super capacitor 18. In this manner, the networked LED light systems may serve as a fire safety device, so that in the event of a fire in the building, fire fighters, police, or other authorized parties may access the light systems and/or the server/storage device, e.g., via a fire department/authorized access interface module 29 (FIG. 3) or a control panel of the building's fire alarm system, and/or by substantially any Internet connected device, to identify the presence and location of individuals who may be trapped or otherwise remain within the building. The fire department may thus quickly and safely download the stored and/or real time information to identify where building occupants were or are at critical points in time (e.g., when the fire started), the number of people in each room, and the movement of the people over time. Moreover, after the light systems are installed, a digital layout of the facility may be uploaded into each light including an evacuation route message appropriate for the location of each light system, which may then be broadcast audibly, as discussed hereinbelow, from the light systems in the event of a fire or other emergency. The lights may also be configured to rapidly blink in a pattern configured to direct the occupants to a nearby exit door.

As also discussed above, the EM sensor and processor 4, 15, periodically look for the overall (e.g., visible) light level within its field of view, which it may then compare with a preset setpoint. For example, in conventional office environments, this setpoint may be set at 50 lumens per square foot, while in environments for intricate work such as hairdressing, haircutting, and coloring, a light level of about 100 lumens per square foot may be desired. Extremely detailed work, such as in precision manufacturing environments, may require up to 150 lumens per square foot or more. So once the desired setpoint has been set, the processor 15 in combination with sensor 4, forms a closed-loop feedback system which adjusts the power supplied to the LEDs 3 (e.g., by use of dimmer 12) to maintain light output at the desired level for the particular environment. For example, during operation, if it is dark outside, the light systems installed in a typical office environment may output enough light to maintain the 50 lumen per square foot (psf) level, but when the sun comes back out, power to lights located in areas illuminated by outside light may be reduced to save energy. The setpoint for each light may be set remotely, e.g., by a computer logged onto the IP network.

It should be recognized that each light system is configured to operate autonomously, e.g., once desired setpoints have been set. However, each light system may also communicate with other light systems, via their IP network e.g., in a peer-to-peer arrangement, to make further adjustments. For example, one of the light systems may see that it is drawing 400 milliamps to meet its desired light output, while nearby lights are drawing at different levels, e.g., 500 and 600 mA, respectively. Each of the lights in this group may then independently adjust and/or calibrate itself, using dimmer 12, to balance the load, e.g., by adjusting to the average of the group. In this example, they would all adjust to the average of 500 milliamps. In particular embodiments, each light would adjust independently to this average, in a peer-to-peer fashion. However, in other embodiments, such adjustment may be effected using a hierarchical approach in which multiple lights are controlled by a single master processor/light sensor, such as those of a single light assembly configured to control other lights in the room or building.

Light systems configured to act autonomously, such as the embodiments shown and described herein, may have advantages in energy savings and security purposes relative to conventional approaches. In large office buildings, conventional lights are often left on wasting large amounts of energy, or are turned off or partially turned off at night as security personnel patrol with a flashlight. In one embodiment of the present invention, the light systems may be configured to operate in night light mode using as little as 1 watt each, while still providing sufficient light to see. While the guards are doing their security rounds, the light systems may be configured to track them and to automatically increase their light output intensity to permit the guards to see clearly. The light systems may also be configured so that in the event an intruder, e.g., detected by the light systems or otherwise, the light systems may remain in night light mode in the vicinity of the security personnel (e.g., using an RFID detector 26) and to track and highlight the intruder's location with bright (high intensity) output in the vicinity of the intruder or by strobing the lights at a predetermined rate to disorient the intruder. The lights may also be configured to audibly direct them to the intruder.

In addition, in some embodiments, EM sensor 4 and/or a separate thermal switch 22 (FIG. 3) may be configured to actuate cooling fan 10, while sensor 4 and/or a thermostat 20 (FIG. 3) may be configured to control actuator (servo motor or solenoid) 14. Actuator 14 may thus direct the warmed air from the cooling fan 10 (i.e., after it has been used to cool the LEDs) either towards a user (e.g., into the room) or away from the user (e.g., into a ceiling plenum). Thus, under normal conditions during the summer, when the integral thermal switch calls for cooling, fan 10 is actuated and air is blown over the backs of the LEDs to cool them, with the air being exhausted into the ceiling plenum. During the wintertime, when the thermostat calls for cooling, the actuator 14 may be triggered to rotate or otherwise move a baffle to close the air vents 11, so that the warm air is exhausted back into the room instead of into the ceiling plenum. In this regard, actuator 14 may be configured to rotate a slotted frusto-conical baffle (not shown), which is superposed with the portion of housing 1 within which the vents 11 are disposed. The actuator may then alternately move the slots of the frusto-conical structure to alternately block and unblock the vents 11. In a variation of this embodiment, in lieu of, or in addition to, thermostat 20, the various light systems may automatically switch between summer and winter modes in accordance with a predetermined settings, such as may be loaded from a computer logged into the IP network. Alternatively, the light systems may adjust themselves between summer and winter modes in accordance with the current date, such as may be ascertained by periodically accessing a suitable Internet website (such as http://time.nist.gov) via their IP network.

In some embodiments a smoke detector 28 (FIG. 3) may be added.

It should be recognized that although a single EM sensor 4 has been shown and described as being reconfigurable, e.g., by processor 15, to perform a variety of operations, such as Infrared light (heat) detection, visible light level detection, and image/video capture, these operations may also be carried out by multiple discrete sensors. For example, sensor 4 may take the form of a photo diode for IR detection, and a separate sensor in the form of a CCD device may be used for image/video capture and visible light level detection, such as shown at sensor 8.

As yet another optional feature, each light may be provided with a speaker driver 13, e.g., in the form of a relatively small block that during operation, serves to vibrate the housing, so that the entire housing effectively acts as a loudspeaker, e.g., the housing itself effectively serves as the speaker diaphragm. A suitable exemplary driver 13 is commercially available from www.Gindar.net. Advantageously, all of the networked lights in a room may be actuated simultaneously, such as to make audible announcements or other alerts to the room occupants, such as the evacuation instructions discussed hereinabove. Since these alerts/announcements are emanating from all of the lights, they should be clearly heard by all of the occupants, even in a large room. In addition, announcements may be easily targeted, using their IP or MAC addresses, to specific rooms/locations within a building. For example, in the event of a fire, automated announcements may be directed to specific areas of the building, e.g., to direct occupants to the exits closest to those specific areas of the building. Also, since the IR imaging capabilities of the lights and/or the fire detection sensors of the fire alarm system may indicate the location of the fire, the announcement (whether automated or made manually by fire rescue personnel), may direct occupants to exit routes that avoid the location of the fire. Moreover, the sensors 4 may be used to track the evacuation movements of occupants, and enable occupants to be warned (e.g., either automatically or by fire rescue personnel) if they appear to be evacuating in the wrong direction, e.g., towards, rather than away from, the location of the fire.

As yet another variation of this feature, the light systems may be configured, e.g., with sensor 4 and/or with a dedicated RFID tag reader 26 (FIG. 3) (or substantially any other proximity detection/communication scheme such as a Bluetooth® transceiver or other similar device). Police, fire safety or other personnel may then wear RFID tags or Bluetooth® enabled devices so that when moving throughout the building the light systems may identify and track them. The light systems may then be used to audibly direct them to people that may remain in the building and/or alert them of dangers ahead.

This approach may also be used in high security buildings to monitor the locations of occupants and record their movements. In this regard, an RFID tag, Bluetooth® capability, or other similar device may be embedded into the access/ID cards typically worn by occupants in order to gain access to such buildings. The RFID tag, etc., may be unique to each user's access/ID card. In this manner, the light systems may be used to identify and monitor the location of individual occupants in the building. This may allow users of the system to communicate directly with specific people, e.g., via a telephone system and/or computer network communicably linked, to the light systems, such as via the IP network used by the light systems as discussed hereinabove. A direct conversation may thus take place with 'Bob' as he is walking down the hall, using the built-in speaker, microphone and optionally, the camera. The same personal communication may be effected with firefighters, police, or other emergency personnel, such as in the event their names are coded or otherwise associated with the RFID/Bluetooth® embedded into their ID cards.

It should be noted that the embodiments shown and described hereinabove may conveniently operate using low voltage, e.g., 12 or 24 VDC, to simplify wiring and to enable a single, relatively small gauge multiple conductor cable to handle both power and communication. However, it should be recognized that substantially any power source, including conventional line voltage (e.g., 110v or 220v AC), may be used without departing from the scope of the present invention.

In particular embodiments, low voltage power may be provided by one or more low voltage power supplies (e.g., line voltage to low voltage transformers/power supplies) located remotely from the lights, e.g., within an electrical panel in a utility closet or basement. The various light systems may be conveniently connected in parallel with one another, e.g., using a two- three- or four-conductor cable system in which two conductors provide power (e.g., positive and ground, respectively), and the remaining one or two connectors are used for signaling, or, in some embodiments the two conductors providing power may be used to carry the communications signals. Alternatively, it should be recognized that communications with the light systems may be effected wirelessly. This approach tends to advantageously simplify wiring for large projects, since a single 'home run' to the power source may be used for a relatively large number of lights. In this regard, due to the high efficiency of the LED lights, and the use of IP/MAC addressing for switching, it is contemplated that a single cable may be used to wire lights for an entire home or office building. In this regard, it should be recognized that wall switches and the like, having their own IP addresses may be communicably coupled to the network to send On/Off signals to designated lights. This remote and centralized placement of power supplies (transformers) also tends to provide for enhanced service life relative to conventional devices, since relatively large, robust components may be used, and which may provide relatively large surface areas for enhanced heat dissipation. This contrasts, for example, with conventional line-voltage LED replacement bulbs (discussed below), which generally use miniaturized on-board components to convert AC line voltage to low voltage DC. Moreover, when the power supplies of the present invention do need to be serviced or replaced, their centralized placement, e.g., in an electrical panel or closet, advantageously enables them to be replaced without also having to replace the LEDs themselves (which as discussed above, have relatively long service lives, e.g., of up to 50,000 to 100,000 hours or more). Because they are installed in an electrical panel/room, their replacement is particularly easy, i.e., without requiring the time consuming and potentially dangerous use of ladders for access to ceiling mounted lights.

The various embodiments discussed herein may save relatively large amounts of energy relative to conventional approaches, even compared with fluorescent office lighting, because LEDs in these embodiments are inherently more efficient than conventional fluorescent lights, because fluorescent lights are not easily dimmed, and are relatively energy intensive upon startup, as discussed above. In contrast, the LEDs of the present invention are easily dimmed, especially when using low voltage direct current LEDs, by simply using a dimmer 12 in the form of a current/voltage limiter, e.g., by lowering the desired setpoint as discussed hereinabove. Alternatively, as mentioned above, more sophisticated approaches such as Pulse Width Modulation (PWM) may also be used for dimming. Such dimming may be used in any of the embodiments disclosed herein, to adjust brightness and/or Kelvin output of the LEDs. Moreover, unlike the aforementioned fluorescent lights, the power drawn by the LEDs generally does not spike upon start-up, so that relatively frequent on/off cycles, such as in response to rapidly changing room occupancies and/or partly sunny conditions outside, tend to enhance energy efficiency.

These embodiments should also provide enhanced useful lifetimes relative to conventional approaches, e.g., approx. 50-100 thousand hours or more per light system assembly, to potentially last for decades without need for replacement. This contrasts with conventional fluorescent lights and with conventional line-voltage LED replacement lights, the latter of which tend to fail due to the components associated with them (e.g., transformers/rectifiers that must be made to small size and packaged into each bulb in order to convert line voltage to DC).

It should be noted that the various modules and other components of the embodiments discussed hereinabove may be configured as hardware, as computer readable code stored in any suitable computer usable medium, such as ROM, RAM, flash memory, phase-change memory, magnetic disks, etc., and/or as combinations thereof, without departing from the scope of the present invention.

It should be understood that any of the features described with respect to one of the embodiments described herein may be similarly applied to any of the other embodiments described herein without departing from the scope of the present invention.

In the preceding specification, the invention has been described with reference to specific exemplary embodiments for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

Having thus described the invention, what is claimed is:

1. A light system comprising: a housing; a plurality of LEDs disposed in spaced relation within the housing and configured to transmit light within a field of illumination; a power source configured to supply operational power to the LEDs; an optical sensor disposed within the housing, and configured to detect ambient light levels within the field of illumination of the LEDs; a dimmer operatively engaged with the power source; a processor communicably coupled to the dimmer and the optical sensor, the processor configured to actuate the dimmer to adjust power supplied to the LEDs in response to levels of light detected by the optical sensor relative to a predetermined setpoint; a packet-based communications module operatively engaged with the processor, and configured to receive from a remote location, adjustments to the predetermined setpoint; a thermostat disposed within the housing; a thermal switch disposed within the housing; a cooling fan disposed within the housing to move cooling air to the LEDs in response to actuation of the thermal switch; at least one vent disposed within the housing; at least one baffle disposed to alternately open and close the vent to alternately direct cooling air from the LEDs towards locations on opposite sides of the housing; an actuator operatively engaged with the baffle, and configured to open and close the vents in response to the thermostat; and a speaker driver disposed within the housing to enable the light system to function as a loudspeaker.

2. A light system comprising: a housing; a plurality of LEDs disposed in spaced relation within the housing and configured to receive operational power from a power source and to transmit light within a field of illumination; an electromagnetic (EM) sensor disposed within the housing, and configured to detect EM radiation levels within the field of illumination of the LEDs; a processor communicably coupled to the EM sensor, the processor configured to generate an output in response to levels of EM radiation detected by the EM sensor relative to a predetermined setpoint; a thermal switch disposed within the housing; a cooling fan disposed within the housing to cool the LEDs in response to actuation of the thermal switch; at least one vent disposed within the housing; at least one baffle disposed to alternately open and close the vent to alternately direct cooling air from the LEDs towards and away from the field of illumination, wherein the baffle is configured to open and close the vent so that air warmed by the LEDs is directed towards a user during cold weather conditions, and away from a user during warm weather conditions; and a speaker driver disposed within the housing, and configured to enable the light system to function as a loudspeaker.

3. The light system of claim 2, wherein the EM sensor is selectively reconfigurable by the processor to detect EM radiation in mutually distinct portions of the EM spectrum ranging from visible light to radio frequency radiation.

4. The light system of claim 2, further comprising: a dimmer configured for operative engagement with the power source; the processor being communicably coupled to the dimmer, and being configured to actuate the dimmer to adjust power supplied to the LEDs in response to levels of light detected by the EM sensor relative to a predetermined setpoint.

5. The light system of claim 2, wherein a dimmer is configured for operative engagement with a low voltage power source.

6. The light system of claim 2, wherein the EM sensor is configured to detect the presence of occupants within the field of illumination of the LEDs, and the processor is configured to transmit information pertaining to the location of the occupants to a network.

7. The light system of claim 6, comprising: a dimmer configured for operative engagement with the power source; the processor being communicably coupled to the dimmer, and being configured to actuate the dimmer to adjust power supplied to the LEDs in response to levels of light detected by the EM sensor relative to a predetermined setpoint.

8. The system of claim 4, wherein the processor is configured to actuate the dimmer to adjust power supplied to the LEDs by selectively turning off power to individual ones of the LEDs.

9. The system of claim 4, wherein the dimmer and the processor are disposed within the housing.

10. The system of claim 5, comprising the low voltage power source configured to supply operational power to the LEDs.

11. The system of claim 10, wherein the low voltage power source comprises a rechargeable device.

12. The system of claim 11, wherein the rechargeable device is selected from the group consisting of a battery and capacitor.

13. The system of claim 10, wherein the low voltage power source comprises a line voltage to low voltage power supply.

14. The system of claim 13, wherein the low voltage power supply comprises an AC to DC converter.

15. The system of claim 13, wherein the power supply is disposed remotely from the housing.

16. The system of claim 2, comprising a packet-based communications module operatively engaged with the processor.

17. The method of claim 16, wherein said packet-based communications module is configured for communication with fire, police and other authorized personnel.

18. The system of claim 16, wherein the packet-based communications module is configured for peer-to-peer communication with other light systems.

19. The system of claim 16, wherein the packet-based communications module is configured to receive from a remote location, adjustments to the predetermined setpoint.

20. The system of claim 2, comprising an anti-vibration support operatively engaged with the cooling fan.

21. The system of claim 2, comprising a thermostat disposed within the housing.

22. The system of claim 21, comprising an actuator operatively engaged with the baffle, and configured to open and close the vent in response to the thermostat.

23. The system of claim 4, wherein the EM sensor is configurable to detect light within the infrared (IR) spectral range to identify the presence of occupants within the field of illumination and the processor is configured to actuate the dimmer to adjust power supplied to individual ones of the LEDs in response to identification of any occupants using the EM sensor.

24. The system of claim 2, comprising a memory communicably couple to the processor, the memory configured to store output of the EM sensor.

25. The system of claim 24, wherein the memory further comprises computer readable program code configured to actuate the light system in accordance with predetermined protocols.

26. The system of claim 23, wherein the EM sensor is configurable to detect the color temperature of the ambient light within the field of illumination of the LEDs and the processor is configured to actuate the dimmer to adjust power supplied to individual ones of the LEDs in response to color temperature levels of light detected by the EM sensor relative to a predetermined setpoint of color temperature.

27. The system of claim 26, wherein the LEDs comprise LEDs of mutually distinct colors.

28. The system of claim 27, wherein the mutually distinct colors comprise mutually distinct color temperatures.

29. The system of claim 28, wherein the LEDs are selected from the group consisting of Red, Green, Blue, and White LEDs, and combinations thereof.

30. The system of claim 24, wherein the EM sensor is configured to capture images within the field of illumination.

31. The system of claim 4, wherein the dimmer is configured to adjust at least one of the brightness and color of light output by the LEDs.

32. The system of claim 31, wherein the dimmer is selected from the group consisting of current limiters, voltage limiters, pulse width modulators, and combinations thereof.

33. A method of illuminating a premises, the method comprising: (a) installing the light system of claim 2; and (b) loading into the light system, the predetermined setpoint, wherein the light system automatically adjusts the output of the LEDs in response to changes in ambient light levels.

34. The method of claim 33, wherein the EM sensor is configured to detect the presence of occupants within the field of illumination, and the method further comprises communicably coupling the light system to an IP network, wherein output of the EM is communicated to a location remote from the light system.

35. The method of claim 34, further comprising installing a plurality of light systems and communicably coupling the plurality of light systems to one another.

36. The method of claim 34, further comprising a smoke detector disposed within the housing and communicably coupled to the processor.

37. The method of claim 34, further comprising a microphone disposed within the housing and communicably coupled to the processor.

38. The method of claim 34, further comprising an RFID detector disposed within the housing and communicably coupled to the processor.

* * * * *